(12) United States Patent
Thomas

(10) Patent No.: US 7,568,718 B1
(45) Date of Patent: Aug. 4, 2009

(54) CABLE AND HITCH PIN ASSEMBLY

(76) Inventor: Donald Thomas, 388 McClurg Rd, #5, Boardman, OH (US) 44514

(*) Notice: Subject to any disclaimer, the term of this patent is extended or adjusted under 35 U.S.C. 154(b) by 293 days.

(21) Appl. No.: 11/500,168

(22) Filed: Aug. 7, 2006

(51) Int. Cl.
*B60D 1/04* (2006.01)
*B60D 1/60* (2006.01)

(52) U.S. Cl. .................. 280/507; 280/506; 280/505; 280/515; 74/18; 74/34; 74/51; 74/53

(58) Field of Classification Search .......... 280/507, 280/506, 505, 515; 70/18, 34, 51, 53
See application file for complete search history.

(56) References Cited

U.S. PATENT DOCUMENTS

| | | | | |
|---|---|---|---|---|
| 1,222,920 A | * | 4/1917 | Blais | .............. 70/30 |
| 5,873,319 A | * | 2/1999 | Bentley | .............. 114/230.2 |
| 6,193,260 B1 | * | 2/2001 | Homan et al. | .............. 280/515 |
| 6,829,915 B1 | * | 12/2004 | Li | .............. 70/18 |
| 6,862,905 B2 | * | 3/2005 | Zapushek | .............. 70/34 |
| 7,059,158 B2 | * | 6/2006 | Freeman | .............. 70/34 |
| 7,121,121 B2 | * | 10/2006 | Wyers | .............. 70/14 |
| 7,316,534 B2 | * | 1/2008 | Hohmann et al. | .............. 411/340 |
| 7,338,065 B1 | * | 3/2008 | Clausen | .............. 280/507 |

* cited by examiner

*Primary Examiner*—Christopher P Ellis
*Assistant Examiner*—Marlon A Arce
(74) *Attorney, Agent, or Firm*—William G. Lane

(57) ABSTRACT

A hitch pin and hitch cable assembly comprising a hitch pin for a tow hitch ball mount with one end of a hitch cable securely attached to the pin; the other end of the hitch cable removably attached to the pin between the ends of the pin; the pin having a lock to lock the pin in a tow hitch ball mount and to lock the second end of the hitch cable on the pin.

14 Claims, 2 Drawing Sheets

CABLE AND HITCH PIN ASSEMBLY

FIELD OF THE INVENTION

This invention is directed to tow hitch equipment. In particular this invention is directed to a combination two hitch ball mount pin and tow hitch cable assembly.

BACKGROUND OF THE INVENTION

Each day over a million trailers are towed on the nation's highways. Many vehicles are equipped with a tow hitch assembly for towing a trailer. The tow hitch assembly is securely attached to the tow vehicle, and it is difficult to remove the tow hitch assembly from the vehicle.

Tow vehicles, that is vehicles equipped with a tow hitch assembly, are normally only used a small percentage of the time for towing. Such vehicles are used mostly for their primary purpose, such as a SUV for transporting passengers, a pickup truck or van for transporting tools and supplies. Such vehicles can receive specialty carriers in the tow hitch ball mount receiver box mounted on the vehicle. The tow hitch ball mount box supports the carrier and its cargo. A large variety of bike rack, motorcycle, and cargo carriers are available, such as the Hitch-Haul Cargo Carrier brand carrier, the Hitch-Haul Carrier brand carrier, the Hitch Haul brand carrier, the Trail Gear brand carrier, Extend-A-Truck brand carrier. Such vehicles and carriers are frequently used to transport bikes and motorcycles ("recreational vehicles" herein) and cargo. The theft of cargo, tools and recreational vehicles from an unattended vehicle is a problem. Attempts have been made to secure cargo, tools and recreational vehicles from theft.

Currently, securing of cargo such as: bicycle carriers, cargo carriers on the rear of vehicles and workplace goods such as compressors, welders in the rear of pickup trucks requires the purchase of two to three different type locks with chains or cables. Additionally, there is almost no place to secure and lock cargo on a pickup truck or tools or recreational vehicles carried on the out side of a automobile, SUV or van. The securing of a carrier on a vehicle, reduces the theft of both the carrier and its cargo, including recreational vehicles. If the carrier is loaded with cargo, theft of the carrier also entails theft of the cargo unless the thief unloads the cargo before removing the carrier. Special security items have been produced for specified cargo and/or vehicles and trailers. A universal security item for all types of vehicles, cargo, and carries does not exist.

The present invention is directed to a means of using the existing tow hitch assembly on a towing vehicle to secure cargo on the tow vehicle. The means can be used whether the tow vehicle is towing a trailer or not.

It is an object of the present invention to provide an assembly that combines a tow hitch ball mount pin, a cargo cable and a pin lock in one assembly.

A further object of the present invention is to provide a means of keeping a hitch pin, a cargo cable and a pin lock together.

An Additional objective is to provide a hitch pin and cargo cable assembly that is lockable and provides another level of lock security for the prevention of thief of cargo from the tow vehicle when the tow vehicle is parked unattended.

A still further object of the present invention is to provide a security means to secure and lock all types of cargo on the exterior of vehicles and pickup trucks. Such security means eliminates the need to purchase multiple parts for securing of different types of goods on different types of vehicles. The present hitch pin, cable and lock assembly allows the consumer to purchase one part that has multiple functions. The present trailer hitch receiver lock with integrated cable can be used on a conventional receiver type trailer hitch and provides a means to also secure cargo to the vehicle.

SUMMARY OF THE INVENTION

The present invention is directed to a cargo cable and hitch pin assembly comprising a tow hitch pin having first and second ends, a cable having a first and second ends, and a pin lock; the hitch pin having a cylindrical shaft and a retainer sleeve secured on the cylindrical shaft near the first end of the pin, and a lock securing means on the cylindrical shaft near the second end of the pin assembly; the pin lock adapted to be lockably received on the cylindrical shaft near the second end of the pin, the first end of the cable secured to the first end of the hitch pin, the second end of the hitch cable secured to a eye coupler, the eye coupler adapted to be received on the cylindrical shaft between the retainer sleeve and hitch receiver, or between the pin lock and hitch receiver.

In another embodiment of the present invention, the cylindrical shaft is adapted to receive a tubular sleeve between the retainer sleeve and the pin lock to increase the diameter of the cylindrical shaft.

In another embodiment of the present invention, the first end of the cable is secured in the first end of the pin by swaging the first end of the pin with the first end of the cable extending into a longitudinal bore in the cylindrical shaft. The cable can also be secured via crimping, pinning or welding to the first end of the pin.

In another embodiment of the present invention, the second end of the cable is secured to the eye coupler by swaging the shank of the eye coupler with the second end of the cable extending into a longitudinal bore in the shank.

In another embodiment of the present invention the retainer sleeve is secured to the cylindrical shank by a blind pin extending through the retainer sleeve and partially into the cylindrical shank.

In still another embodiment of the hitch cable and pin assembly the cable is sheathed in a protective elastomeric sheath, such as neoprene or other elastomeric materiel designed to cover the cable to prevent damage to surfaces, paint coatings and to protect the cable against corrosion.

In one preferred embodiment, the cable and pin assembly comprises a hitch pin having first and second ends, a cable having a first and second ends and a sheath of elastomeric material extending from the first and second ends, and a pin lock; the hitch pin having a cylindrical shaft and a retainer sleeve secured on the cylindrical shaft near the first end of the pin by a blind pin extending through the retainer sleeve and partially into the cylindrical shank, the cylindrical shaft adapted to receive a tubular sleeve between the retainer sleeve and the hitch pin lock to increase the diameter of the cylindrical shaft and a lock securing means on the cylindrical shaft near the second end of the pin assembly; the pin lock adapted to be lockably received on the cylindrical shaft near the second end of the pin, the first end of the cable is secured in the first end of the pin by swaging the first end of the pin with the first end of the cable extending into a longitudinal bore in the cylindrical shaft, the second end of the cable is secured to the eye coupler by swaging the shank of the eye coupler with the second end of the cable extending into a longitudinal bore in the shank, the eye coupler adapted to be received on the cylindrical shaft between the retainer sleeve and the pin lock.

A further embodiment of the present invention comprises a tow hitch assembly comprising a tow hitch ball mount assembly for a towing vehicle, a ball mount for the tow hitch ball couple assembly, and a cable and hitch pin assembly; the tow hitch ball mount assembly having a box to removably receive the ball mount, the tow hitch ball mount received within the box, the box and the tow hitch ball mount having like diameter hitch pin bores that are aligned to receive a hitch pin to secure the tow hitch ball mount in the receiver box, the cable and hitch pin assembly comprising a hitch pin having first and second ends, a cable having a first and second ends, and a pin lock; the pin having a cylindrical shaft and a retainer sleeve secured on the cylindrical shaft near the first end of the hitch pin, and a lock securing means on the cylindrical shaft near the second end of the hitch pin assembly; the pin lock lockably received on the cylindrical shaft near the second end of the hitch pin, the first end of the hitch cable secured to the first end of the hitch pin, the shaft of the hitch pin between the retainer sleeve and the pin lock received within the like diameter bores of the tow hitch ball mount and the hitch receiver box to secure said ball mount in said box, the second end of the hitch cable secured to a eye coupler, the eye coupler received on the cylindrical shaft between the retainer sleeve and the pin lock.

In still a further embodiment, the eye coupler is received on the cylindrical shaft between the box and the pin lock.

In a still another embodiment of the trailer coupler assembly, the cable between its first and second ends is snaked through an enclosed opening in the cargo on the tow vehicle. An enclosed opening means an opening in the cargo that can receive the cable and when the cable is locked as described herein, the cargo is secured by the cable and the cargo can only be removed and taken away from the vehicle when the cable is unlocked and withdrawn from the opening in the cargo. Examples of enclosed openings for cargo include the opening in the triangle frame of a bike, the openings between the spokes of motorcycle wheels, and the like.

DETAILED DESCRIPTION OF THE PRESENT INVENTION

Figure 1:
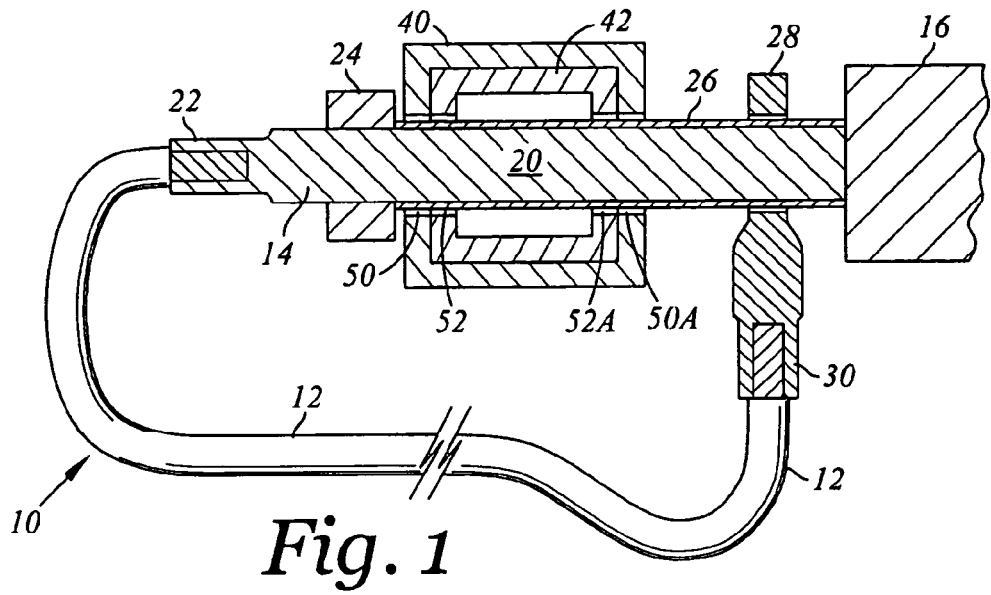
FIG. 1 is a cross-sectional view of FIG. 2 along the line of the hitch pin and hitch cable.
Figure 2:
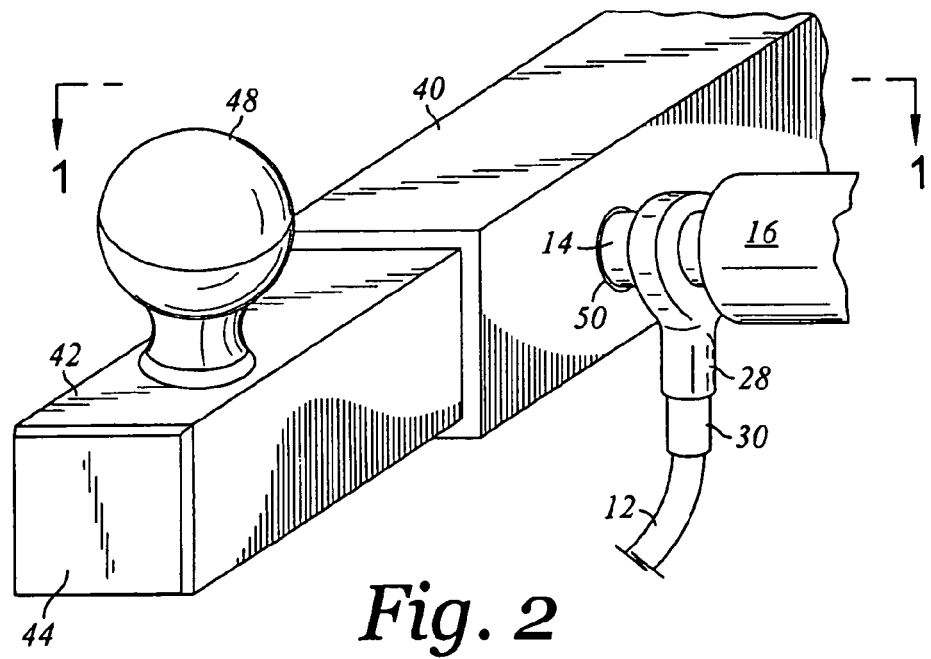
FIG. 2 is a top, front perspective view of the hitch pin and hitch cable assembly of the present invention.
Figure 3:
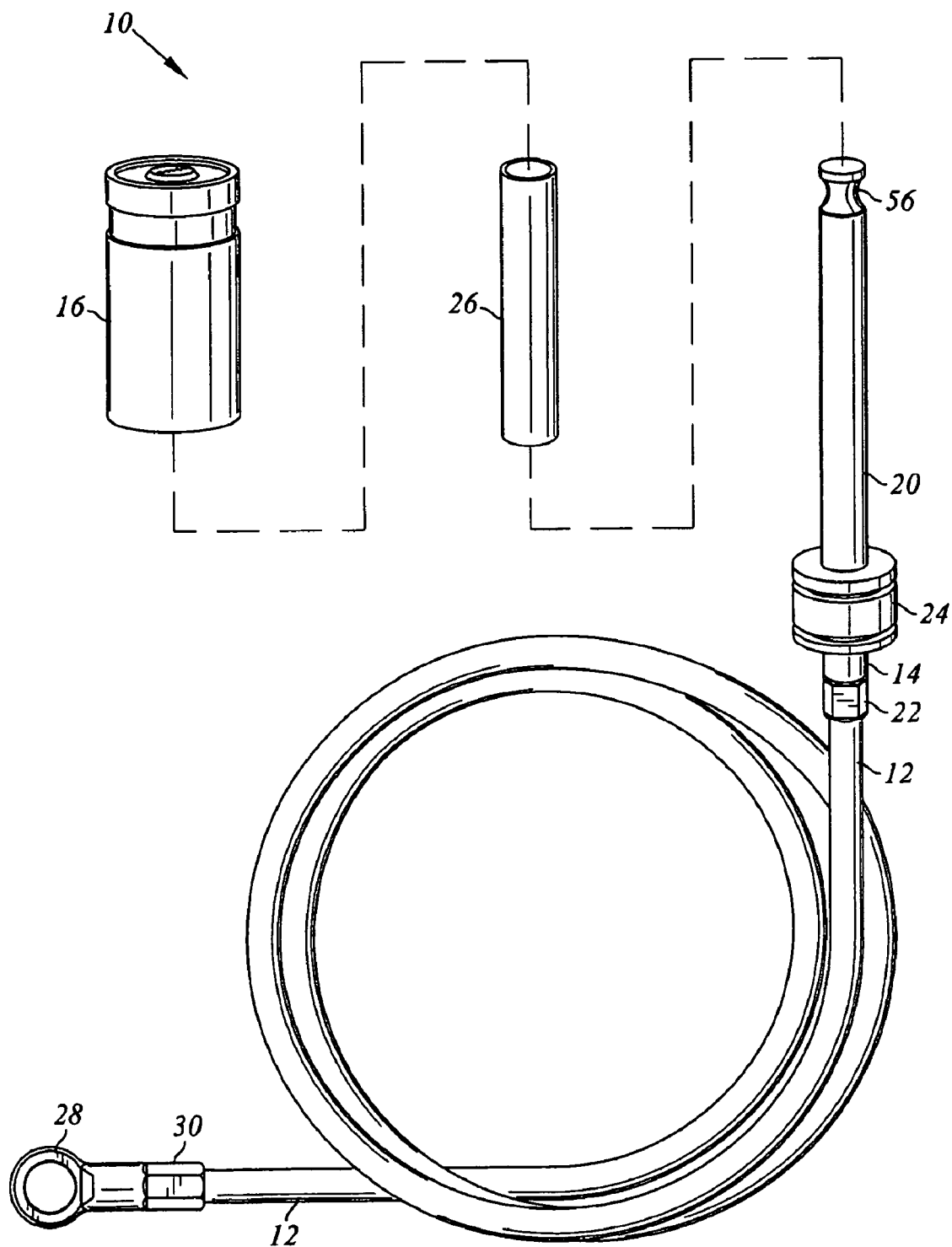
FIG. 3 is a telescopic view if the hitch pin and hitch cable of the present invention.

Referring to FIGS. 1 through 3, the hitch pin and hitch cable assembly 10 of the present invention comprises a pin 14, a cable 12, and a pin lock 16. The pin 14 has a cylindrical shaft 20 with a first end and second end, a retainer sleeve 24 secured to the cylindrical shaft 20 near the first end, and locking groove 56 in the cylindrical shaft near the second end. The pin lock 16 can be unlockably secured to the second end of the pin. The pin lock 16 can be a keyed lock of conventional design, or a combination lock of conventional design. In the lock illustrated, a keyed pin lock, the locking groove 56 engages opposing metal balls (not shown) in the pin lock 16 to lock the lock pin onto the cylindrical shaft 20. Other well known locking means can be employed to lock the lock onto the cylindrical shaft. The pin lock is a keyed lock and when unlocked disengages the metal balls from the locking groove and permits the pin lock to be slid off the cylindrical shaft. Alternatively, the second end of the pin can be secured with a attachment means that can be readily detached. The lock means is preferred because its offers security against theft and unauthorized tampering with the hitch pin.

The first end of the pin 14 has a short longitudinal bore. The first end of the cable 12 is positioned in the pin 14 and the first end of the cylindrical shaft 20 is swaged down to form the swaged end portion 22 which securely attaches the cable 12 to the pin. The second end of the cable 12 is attached to an eye coupler 28. The shank 30 of the coupler has a short longitudinal bore. The second end of the cable is positioned in the bore and the shank of the eye coupler is swaged down to form a swaged portion of shank 30 which securely attaches the cable to the eye coupler. The cable can be secured to the pin and the eye coupler by other means including crimping, welding, and pinning. Preferably, the cable is sheathed with an elastomeric sheath, such as a neoprene sheath, to protect the finishes on the surfaces of the towing vehicle and the cargo, and to minimize corrosion to the cable.

The hitch pin 14 is adapted to be received in the pin bores 52 and 52A, and 50 and 50A, respectively, of the tow hitch ball mount 42 and tow hitch ball mount box 40. The end of the tow hitch ball mount 42 can be closed off with a cover 44. The bores 52, 52A, 50 and 50A are adapted to be axially aligned when the tow hitch ball mount 42 with the tow hitch ball 48 is seated in the tow hitch ball mount box or receiver 40. To prevent the pin 14 from moving through and out of the bores to expose the cable to the bores, a retainer sleeve 24 is secured to the cylindrical shaft 20 near the first end of the pin. If the cable entered the hitch bores, The cable is not designed as a replacement for the cylindrical shaft which is treated to take shear forces. The interaction of the ball mount in the box or receiver will cause the edges of the bores 50 and 52, and 50A and 52A to act as knife edges which can cut through the cable with time. Once the pin is received in the bores 50 and 52, the pin is secured with a pin lock 16. Preferably, the pin is secured at its second end by pin lock 16 which prevents the pin from sliding back out of the bores.

Once the pin 14 is positioned in the bores, the second end of the cable is snaked through an enclosed opening in the cargo. After the cable engages or secures the cargo, the eye coupler 28 on the second end of the cable 12 is preferably passed onto the cylindrical shaft 20 via the free second end of the pin. The cable through the eye coupler is now attached at both ends to the hitch pin. The pin lock 16 is slid onto the pin via the second end of the pin and locked capturing the second end of the hitch cable on the pin between the side wall of the ball mount box and the pin lock. This assembly when locked prevents the pin from being accidentally or intentionally removed, or from coming loose by vehicle or road movement. In addition with the cable engaging cargo on the bed of a pickup truck or the exterior of a tow vehicle, it provides a cargo cable securing the cargo to the tow vehicle.

The pin bores in the receiver box or receiver typically comes in one of two sizes: ½ inch diameter and ⅝ inch diameter. The ½ inch bore is used in a receiver box for a tow hitch ball mount assembly rated for trailers and cargo up to 5000 pounds. The ⅝ inch bore is used in a receiver box for a tow hitch ball mount assembly rated for trailers and cargo up to 12000 pounds. Preferably the present assembly uses a cylindrical shaft that will fit a ½ inch bore. When the assembly is to be used in a ⅝ inch bore, the tubular sleeve 26 is received on the cylindrical shaft which increases the diameter of the hitch pin to fit a ⅝ inch hitch bore. Thus the present pin can be used on the two sizes of tow hitch ball mount assemblies currently available. The cable and hitch pin assembly can be used to secure cargo on the tow vehicle whether it is towing a trailer or not, and it can be used to secure carrier with a tow hitch ball mount extension, such as the Caebela's Trail Gear brand bike carrier, and their cargo, i.e. bikes, on the tow vehicle whether it is towing a trailer or not.

Since the pin, the pin lock and the cable are combined into a single assembly, it greatly diminishes the opportunity for one or more of these components to be misplaced or lost. The assembly is large by virtue of the cable and it is rare for the cable to be left behind or misplaced when the assembly is removed from the ball mount box or receiver of the tow vehicle because of its size.

What is claimed is:

1. A cable and hitch pin assembly comprising a hitch pin having first and second ends, a cable having a first and second ends, and a pin lock; the hitch pin having a cylindrical shaft and a retainer sleeve secured on the cylindrical shaft near the first end of the hitch pin, and a lock securing means on the cylindrical shaft near the second end of the hitch pin assembly; the pin lock adapted to be lockably received on the cylindrical shaft near the second end of the hitch pin, wherein the first end of the cable is secured in the first end of the hitch pin by swaging the first end of the cable in a longitudinal bore in the first end of the hitch pin, the second end of the cable secured to an eye coupler, the eye coupler adapted to be received on the cylindrical shaft between the retainer sleeve and the pin lock.

2. The cable and hitch pin assembly according to claim 1 including a sleeve received on the cylindrical shaft between the retainer sleeve and the pin lock to increase the diameter of the cylindrical shaft.

3. The cable and hitch pin assembly according to claim 1 wherein the eye coupler has a shank, the second end of the cable is secured to the eye coupler by swaging the second end of the cable in a longitudinal bore in the shank.

4. The cable and hitch pin assembly according to claim 1 wherein the retainer sleeve is secured to the cylindrical shaft by a blind pin extending through the retainer sleeve and partially into the cylindrical shaft.

5. The cable and hitch pin assembly according to claim 1 wherein the cable is sheathed in a protective elastomeric sheath.

6. A cable and hitch pin assembly comprising a hitch pin having first and second ends, a cable having a first and second ends and a sheath of elastomeric material extending from the first end to the second end, and a pin lock; the hitch pin having a cylindrical shaft and a retainer sleeve secured on the cylindrical shaft near the first end of the hitch pin by a blind pin extending through the retainer sleeve and partially into the cylindrical shaft, the cylindrical shaft adapted to receive a sleeve between the retainer sleeve and the pin lock to increase the diameter of the cylindrical shaft and a lock securing means on the cylindrical shaft near the second end of the hitch pin assembly; the pin lock adapted to be lockably received on the cylindrical shaft near the second end of the hitch pin, the first end of the cable is secured in the first end of the hitch pin by swaging the first end of the cable in a longitudinal bore in the first end of the hitch pin, the second end of the cable is secured to an eye coupler having a shank by swaging the second end of the cable extending in a longitudinal bore in the shank, the eye coupler adapted to be received on the cylindrical shaft between the retainer sleeve and the pin lock.

7. A tow hitch ball mount assembly for a tow vehicle, a ball mount for the tow hitch ball mount assembly, and a cable and hitch pin assembly; the tow hitch ball mount assembly having a box to removably receive the ball mount, the ball mount removably received within the box, the box and the ball mount having like diameter bores that are aligned to receive a hitch pin to secure the ball mount in the box, the cable and hitch pin assembly comprising a hitch pin having first and second ends, a cable having a first and second ends, and a pin lock; the hitch pin having a cylindrical shaft and a retainer sleeve secured on the cylindrical shaft near the first end of the hitch pin, and a lock securing means on the cylindrical shaft near the second end of the hitch pin assembly; the pin lock adapted to be lockably received on the cylindrical shaft near the second end of the hitch pin, the first end of the cable secured in the first end of the hitch pin by swaging the first end of the cable in a longitudinal bore in the first end of the hitch pin, the cylindrical shaft of the hitch pin between the retainer sleeve and the pin lock received within the like diameter bores of the ball mount and the box to secure said ball mount in said box, the second end of the cable secured to an eye coupler, the eye coupler adapted to be received on the cylindrical shaft between the retainer sleeve and the pin lock.

8. The tow hitch ball mount assembly according to claim 7 wherein the eye coupler is received on the cylindrical shaft between the box and the pin lock.

9. The tow hitch ball mount assembly according to claim 7 wherein the cable between its first and second ends is adapted to be snaked through a cable receiver on the towing vehicle.

10. The tow hitch ball mount according to claim 7 including a sleeve received on the cylindrical shaft between the retainer sleeve and the pin lock to increase the diameter of the diameter of the hitch pin to near the diameter of the bores.

11. The tow hitch ball mount assembly according to claim 7 wherein the first end of the cable is secured in the first end of the hitch pin by swaging the first end of the cable in the longitudinal bore in the cylindrical shaft.

12. The tow hitch ball mount assembly according to claim 7 wherein the eye coupler has a shank and the second end of the cable is secured to the eye coupler by swaging the cable in a longitudinal bore in the shank.

13. The tow hitch ball mount assembly according to claim 7 wherein the retainer sleeve is secured to the cylindrical shaft by a blind pin extending through the retainer sleeve and partially into the cylindrical shaft.

14. The tow hitch ball mount assembly according to claim 7 wherein the cable is sheathed in a protective elastomeric sheath.

* * * * *